United States Patent
Takashima

(10) Patent No.: US 10,912,261 B2
(45) Date of Patent: Feb. 9, 2021

(54) PLANT CULTIVATION DEVICE

(71) Applicants: FUJI SEIKO CO., LTD., Hashima (JP); FUJI SHOJI CO., LTD., Hashima (JP)

(72) Inventor: Katsunori Takashima, Hashima (JP)

(73) Assignees: FUJI SEIKO CO., LTD., Hashima (JP); FUJI SHOJI CO., LTD., Hashima (JP)

(*) Notice: Subject to any disclaimer, the term of this patent is extended or adjusted under 35 U.S.C. 154(b) by 187 days.

(21) Appl. No.: 15/548,528

(22) PCT Filed: Feb. 6, 2015

(86) PCT No.: PCT/JP2015/053347
§ 371 (c)(1),
(2) Date: Aug. 3, 2017

(87) PCT Pub. No.: WO2016/125296
PCT Pub. Date: Aug. 11, 2016

(65) Prior Publication Data
US 2018/0014473 A1    Jan. 18, 2018

(51) Int. Cl.
*A01G 31/04*    (2006.01)
*A01G 9/029*    (2018.01)
(Continued)

(52) U.S. Cl.
CPC ............ *A01G 9/0295* (2018.02); *A01G 3/00* (2013.01); *A01G 7/045* (2013.01); *A01G 9/12* (2013.01);
(Continued)

(58) Field of Classification Search
CPC ........ A01G 31/00; A01G 31/02; A01G 31/04; A01G 31/042; A01G 31/06; A01G 7/04; A01G 7/045; A01G 9/0295; A01G 9/12
See application file for complete search history.

(56) References Cited

U.S. PATENT DOCUMENTS 3,058,263 A * 10/1962 Reynolds .............. A01G 27/04
                                                    47/80
4,369,598 A *  1/1983 Beckwith .............. A01G 31/06
                                                    220/4.27
(Continued)

FOREIGN PATENT DOCUMENTS

FR    2819984       9/2003
JP    62-55029 A    3/1987
(Continued)

OTHER PUBLICATIONS

International Search Report dated Apr. 28, 2015, in PCT/JP2015/053347 filed Feb. 6, 2015.
(Continued)

*Primary Examiner* — Thanh Pham
(74) *Attorney, Agent, or Firm* — Oblon, McClelland, Maier & Neustadt, L.L.P.

(57) ABSTRACT

The plant cultivation device which workability of cutting of the leaves of the plant at the base portion thereof from the root portion of the plants. The plant cultivation device includes a culture medium holding portion in a cylindrical shape, accommodating and holding a seedling culture medium, arranged in the through-holes of the fluid passage member and absorbing the culture fluid into the seedling culture medium and a leaf supporting portion formed in a cylindrical shape, arranged at an upper side of the culture medium holding portion and supporting the leaves from around the leaves which are cultivated from the seeds. The culture medium holding portion and the leaf supporting portion are formed such that a cutting tool, used for separation between the seedling culture medium and the leaves, can be insertable from outside into a bordering portion between the culture medium holding portion and the leaf supporting portion.

12 Claims, 6 Drawing Sheets

(51) Int. Cl.
*A01G 9/12* (2006.01)
*A01G 3/00* (2006.01)
*A01G 7/04* (2006.01)
*A01G 27/00* (2006.01)

(52) U.S. Cl.
CPC ............ *A01G 27/005* (2013.01); *A01G 31/04* (2013.01); *Y02P 60/21* (2015.11)

(56) References Cited

U.S. PATENT DOCUMENTS

| | | | | |
|---|---|---|---|---|
| 4,476,651 | A | * | 10/1984 | Drury .................. A01G 31/042 47/65 |
| 4,669,217 | A | * | 6/1987 | Fraze .................... A01G 31/02 47/64 |
| 5,323,567 | A | | 6/1994 | Nakayama et al. |
| 6,105,309 | A | * | 8/2000 | Takayanagi ............ A01G 31/02 47/62 A |
| 2004/0163308 | A1 | * | 8/2004 | Uchiyama .............. A01G 7/045 47/1.01 R |
| 2007/0113472 | A1 | | 5/2007 | Plowman |
| 2009/0199470 | A1 | * | 8/2009 | Capen ...................... F21K 9/00 47/58.1 LS |
| 2012/0131850 | A1 | * | 5/2012 | Chen ........................ A01G 9/02 47/65.5 |
| 2013/0305601 | A1 | * | 11/2013 | Park ........................ A01G 31/04 47/17 |
| 2014/0223818 | A1 | * | 8/2014 | Coghlan ................ A01G 31/02 47/62 R |

FOREIGN PATENT DOCUMENTS

| | | |
|---|---|---|
| JP | 63-240731 A | 10/1988 |
| JP | 11-155373 A | 6/1999 |
| JP | 2001-95383 A | 4/2001 |
| JP | 2003-265048 A | 9/2003 |
| JP | 2013-201984 A | 10/2013 |
| WO | WO 02/03777 A1 | 1/2002 |

OTHER PUBLICATIONS

Combined Chinese Office Action and Search Report dated Nov. 4, 2019 in Patent Application No. 201580075284.3 (with English language translation), p. 1-25.

* cited by examiner

PLANT CULTIVATION DEVICE

TECHNICAL FIELD

The present invention relates to a plant cultivation device.

BACKGROUND ART

A method for cultivating plants indoors, enabling the plants to strike roots into the fluid passage member, through which the culture fluid flows, has been disclosed, for example, in Patent Literatures 1 and 2. Further, the Patent Literature 2 describes that the plants are movable in one direction according to the growth of the plants. In other words, seeds or the nursery plants are arranged at the upstream side with respect to the moving direction and the sufficiently grown plants are arranged at the downstream side with respect to the moving direction. Still further, the neighboring plants are arranged to have sufficient space therebetween in order to respond to the size change associated with the growth of the plants.

Further, Patent Literature 3 discloses that the height of the light source is changed in accordance with the growth of the plants. Patent Literature 4 discloses the protection member which makes the floral buds of the plants to grow straightly erecting upright.

CITATION LIST

Patent Literature

[Patent Literature 1] JP H11 (1999)-155373 A
[Patent Literature 2] JP S62 (1987)-55029 A
[Patent Literature 3] JP S63 (1988)-240731 A
[Patent Literature 4] JP 2003-265048 A

SUMMARY OF INVENTION

Technical Problem

Regarding to the plants with leaves, such as for example, lettuces, the base portions of the leaves are cut from the root portions of the plants after the growth of the plants and only the leaves are wrapped by the wrapping materials. However, hitherto, the workers had to cut the base portions of the leaves by holding the leaves not to droop down and this was not an easy work for the workers.

The objective of the invention is to provide a plant cultivation device which can improve the workability of the process of cutting base portion of the leaves.

Solution to Problem

The plant cultivation device according to the present invention is characterized in that the plant cultivation device, which obtains leaves of a cultivated plant by cutting base portion of the leaves from a root portion of the cultivated plant, includes a fluid passage member formed with a fluid passage through which a culture fluid flows and formed with a plurality of through-holes on an upper surface of the fluid passage member with a predetermined interval separated from one another and arranged along the fluid passage, a seedling culture medium on which seeds of the plants are arranged, a culture medium holding portion formed in a cylindrical shape, accommodating therein the seedling culture medium to hold thereof, arranged in the plurality of through-holes of the fluid passage member and absorbing the culture fluid into the seedling culture medium and a leaf supporting portion formed in a cylindrical shape, arranged at an upper side of the culture medium holding portion and supporting the leaves which are grown from the seeds at the circumference of the leaves. The culture medium holding portion and the leaf supporting portion are formed such that a cutting tool used for separation between the seedling culture medium and the leaves can be insertable from outside into a bordering portion between the culture medium holding portion and the leaf supporting portion.

The plant cultivation device according to the present invention is provided with a cylindrical leaf supporting portion and accordingly, the drooping of the grown leaves can be suppressed. Further, the culture medium holding portion and the leaf supporting portion are formed such that a cutting tool used for separation of the leaves from the seedling culture medium can be insertable from outside into a bordering portion between the culture medium holding portion and the leaf supporting portion. Thus, the workability of cutting process of cutting the leaves from the root portion of the plants can be improved, keeping suppression of leaves drooping.

DESCRIPTION OF EMBODIMENTS (1. Overall Structure of Plant Cultivation Device)

Figure 1:
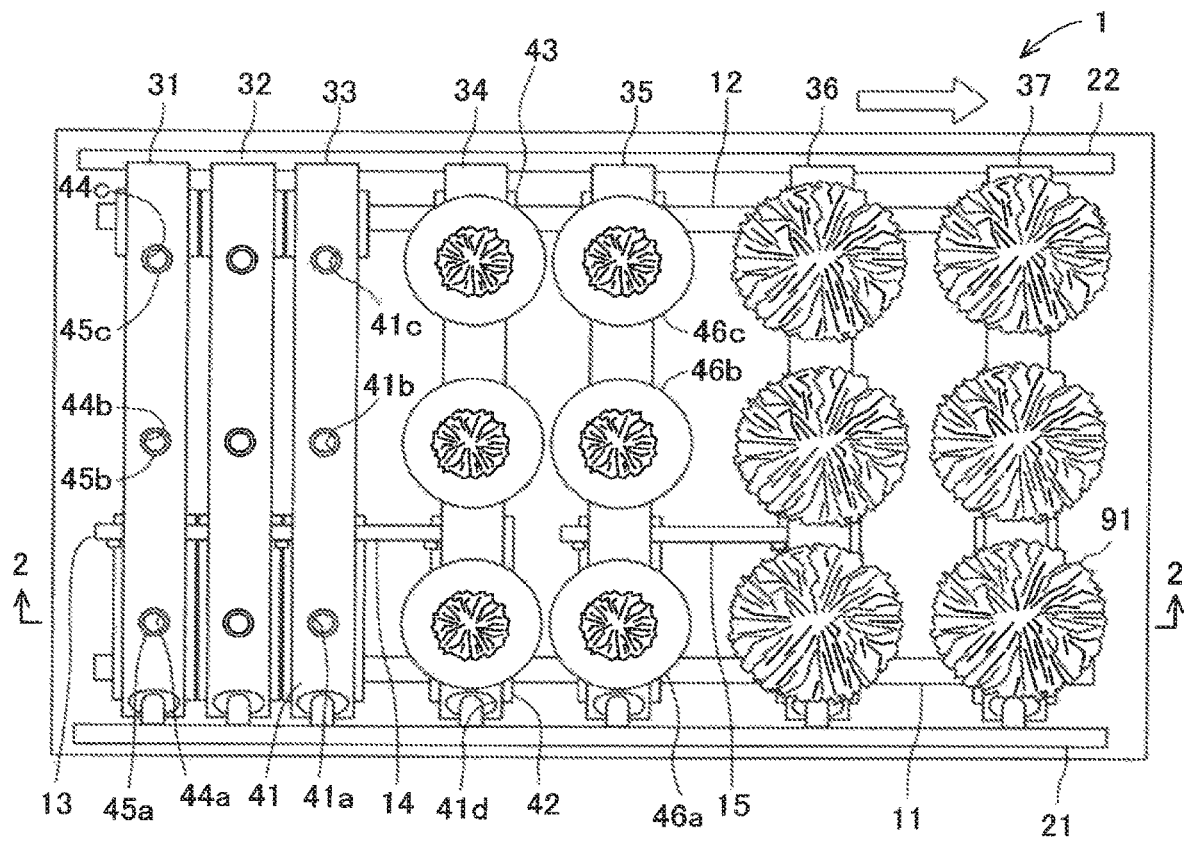
FIG. 1 is a plane view of the plant cultivation device associated with the embodiment of the invention, but FIG. 1 is a view in which a lighting device is omitted.
Figure 2:
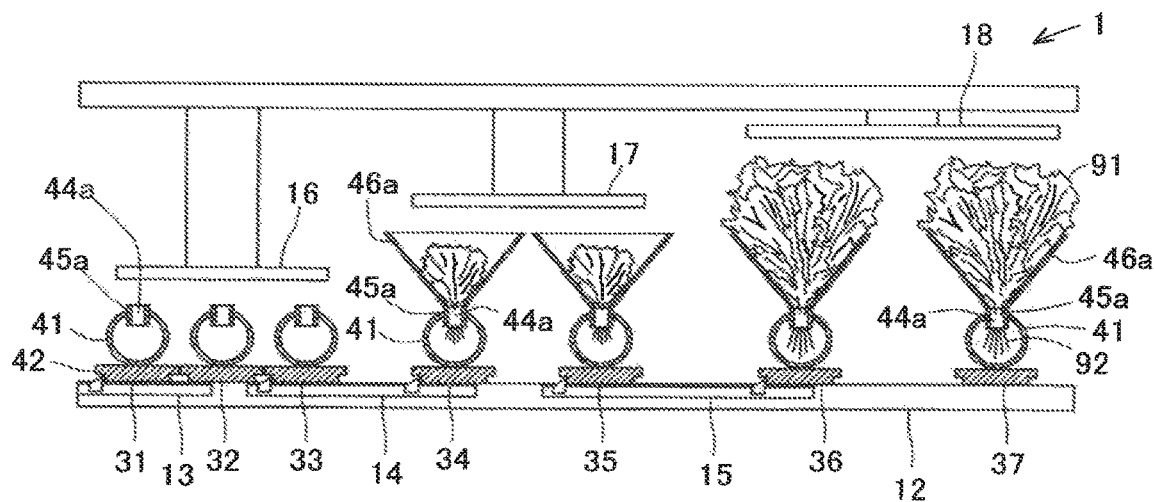
FIG. 2 is a cross-sectional view, cut along the line 2-2 of FIG. 1.

The overall structure of the plant cultivation device 1 will be explained with reference to FIG. 1 through FIG. 4. In FIGS. 1 and 2, transfer units 31 through 37 of the plant cultivation device 1 are transferred from left to right as viewed in FIG. 1 (in an arrow direction). A worker feeds a new transfer unit 31 at the left side as viewed in the drawing and collects the transfer unit 37 at the right side as viewed in the drawing.

Figure 3:
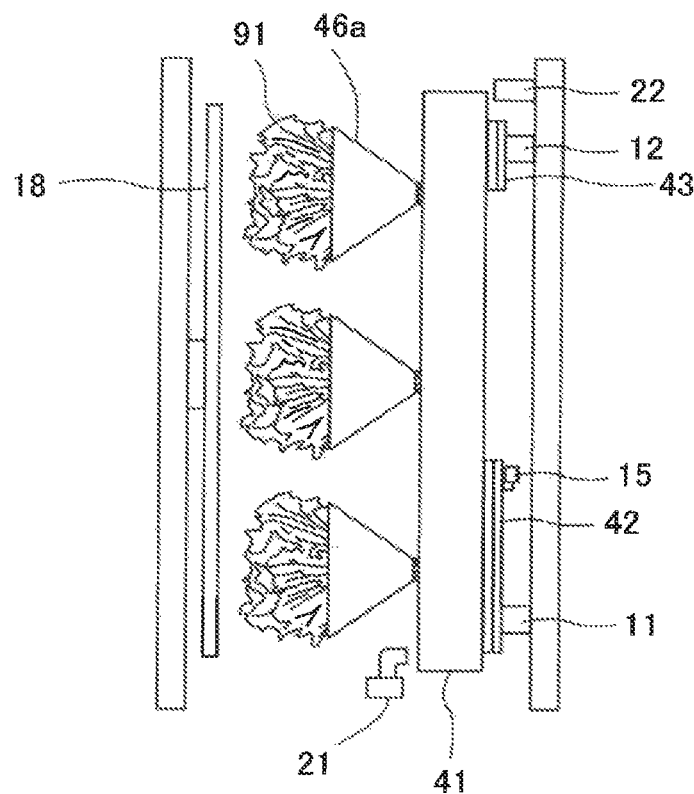
FIG. 3 is a view of the plant cultivation device in FIG. 1 but seen from the right side.

As shown in FIGS. 1 through 3, the plant cultivation device 1 is provided with a pair of rails 11 and 12, the transfer units 13 through 15, lighting devices 16 through 18, a culture fluid supplying portion 21 and a culture fluid collecting portion 22 as the portions originally prepared in advance. Further, the plant cultivation device 1 also is provided with the transfer units 31 through 37 for holding the plants, as a movable body. The transfer units 31 through 37 are transferred in a transfer direction sequentially.

The pair of rails 11 and 12 is provided in parallel with each other extending in the transfer direction of the transfer units 31 through 37 (in the arrow direction of FIG. 1). The pair of rails 11 and 12 is provided for guiding the transferring of the transfer units 31 through 37.

Figure 4:
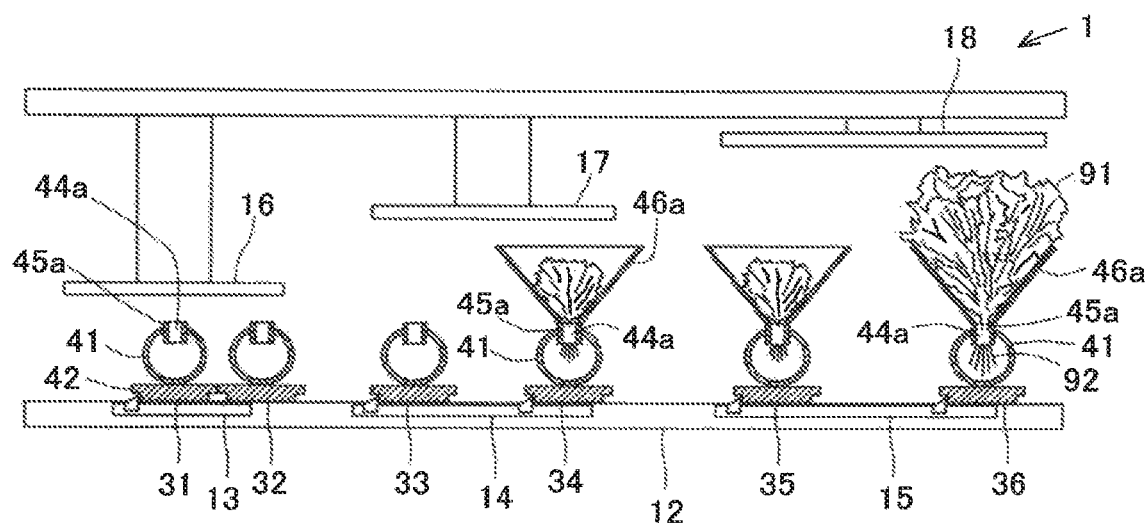
FIG. 4 is a view showing a state of plants of the plant cultivation device transferred from the state shown in FIG. 2 by a transfer mechanism.

The transfer mechanisms 13 through 15 are provided between the pair of rails 11 and 12, respectively, as shown in FIGS. 2 and 4 for transferring the transfer units 31 through 37 in the transfer direction. The first transfer mechanism 13 transfers the transfer units 31 and 32 to the respective next positions. The second transfer mechanism 14 is provided at the downstream side of the transfer direction with respect to the first transfer mechanism 13 in series therewith. The second transfer mechanism 14 transfers the transfer units 33 and 34 to the respective next positions. The third transfer mechanism 15 is provided at the downstream side of the transfer direction with respect to the second transfer mechanism 14 in series therewith. The third transfer mechanism 15 transfers the transfer units 35 through 37 to the respective next positions. It is noted that the transfer mechanisms 13 through 15 are structured to be a so-called one-way clutch which can return from the state shown in FIG. 4 to the state shown in FIG. 2.

The transferring distances of the transfer mechanisms 13 through 15 are set to become longer in order from the transferring distance by the first transfer mechanism 13, the transferring distance by the second transfer mechanism 14 and the transferring distance by the third transfer mechanism 15. In other words, the distances between the mutually neighboring transfer units 31 through 33 are the shortest, the distances between the mutually neighboring transfer units 33 through 35 are the second shortest and the distances of the mutually neighboring transfer units 35 through 37 are the longest. Thus, the transfer mechanisms 13 through 15 transfer the transfer units 31 through 37 by changing the distances of neighboring transfer units 31 through 37.

The lighting devices 16 through 18 shed light over the plants held on the transfer units 31 through 37 by which the plants are to be transferred. The height of each lighting device 16 through 18 is different from one another. The first lighting device 16 is provided at the position corresponding to the transfer units 31 through 33. This position of the first lighting device 16 is the lowest among the three. The second lighting device 17 is provided at the position corresponding to the positions of the transfer units 34 and 35 and this position is higher than the position of the first lighting device 16. The third lighting device 18 is provided at the position corresponding to the positions of the transfer units 36 and 37 and the position is higher than the position of the second lighting device.

The culture fluid supplying portion 21 is at outside one (lower side as viewed in FIG. 1) of the pair of rails 11 and 12 which is arranged in mutually opposing direction (up/down direction as viewed in FIG. 1). The culture fluid supplying portion 21 supplies the fluid passage member 41 which forms the position fixed transfer units 31 through 37 with the culture fluid. The culture fluid collecting portion 22 is provided at the other outside one (upper side as viewed in FIG. 1) of the pair of rails 11 and 12 which is arranged in opposing direction. The culture fluid collecting portion 22 collects the culture fluid discharged from the fluid passage member 41 which forms the position fixed transfer units 31 through 37.

(2. Outline of Transfer Unit)

Each of the transfer units 34 through 37 is provided with the fluid passage member 41, supporting members 42 and 43, seedling culture media 44a through 44c, culture medium holding portions 45a through 45c and the leaf supporting portions 46a through 46c.

The fluid passage member 41 is formed in a cylindrical shape and is provided with a fluid passage through which the culture fluid flows. According to the embodiment, the shape of the fluid passage member is cylindrical with a circular cross section, however, the shape is not limited to cylindrical with the circular cross section and for example, a rectangular tube shape may be used. A plurality of through-holes 41a through 41c is provided on the upper surface of the fluid passage member 41 extending along the fluid passage with predetermined intervals separated from one another. According to the embodiment, the through-holes are formed in circular shape holes. A hole is provided at the upper surface of one end of the fluid passage member 41 through which the culture fluid from the culture fluid supplying portion 21 is supplied. Another through hole (not shown) is provided at the upper surface of the other end of the fluid passage member 41 for discharging the culture fluid to the culture fluid collecting portion 22. The culture fluid is flown from the one end side towards the other end side of the fluid passage member 41.

The supporting members 42 and 43 are provided at the lower surface of the fluid passage member 41 and positioned corresponding to the positions of the pair of rails 11 and 12, respectively. The supporting member 42 moves on the pair of rails 11 and 12 and further, the supporting member 42 is engaged with the transfer mechanisms 13 through 15 in the transfer direction and movable according to the operation of the transfer mechanisms 13 through 15. In other words, by the movement of the supporting members 42 and 43 in the transfer direction, the fluid passage member 41 moves in the transfer direction.

The seeds are arranged on the seedling culture media 44a through 44c. According to the embodiment, the seedling culture media 44a through 44c are formed in a columnar shape. The seedling culture media 44a through 44c are made by a material which can absorb the culture fluid which flows through the inside of the fluid passage member 41.

The culture medium holding portions 45a through 45c are formed in a cylindrical shape and are made by material such as for example, by PP (Polypropylene) resin or PET (Polyethylene Terephthalate) resin. The culture medium holding portions 45a through 45c are formed to be a film with, for example, several millimeters in thickness having a flexible characteristic. The culture medium holding portions 45a through 45c accommodate and hold the seedling culture media 44a through 44c. The culture medium holding portions 45a through 45c are provided in the plurality of through-holes 41a through 41c of the fluid passage member 41. Portions of the culture medium holding portions 45a through 45c are projecting upward from the through-holes 41a through 41c. On the other hand, portions of the remaining portions of the culture medium holding portions 45a through 45c are arranged to be immersed in the culture fluid which flows through the inside of the fluid passage member 41 and accordingly, the culture medium holding portions 45a through 45c are positioned where the culture fluid is absorbed in the seedling culture media 44a through 44c.

Further, the leaf supporting portions 46a through 46c are formed in a cylindrical shape and are made by material such as for example, by the PP resin or PET resin. The leaf supporting portions 46a through 46c are formed at upper side relative to the culture medium holding portions 45a through 45c. The upper side openings of the leaf supporting portions 46a through 46c are formed to be larger than the lower side openings thereof. The leaf supporting portions 46a through 46c are formed separately from the culture medium holding portions 45a through 45c and detachably attached to the culture medium holding portions 45a through 45c. The leaf supporting portions 46a through 46c support the leaves 91 which have grown from the seeds at the circumference of the leaves 91. In other words, the leaf supporting portions 46a through 46c prevent the leaves 91 from drooping down.

It is noted here that the leaf supporting portions 46a through 46c are formed in a tapered cylindrical shape. The leaf supporting portions 46a through 46c are provided on the culture medium holding portions 45a through 45c so that the small opening side of the leaf supporting portions 46a through 46c faces downward. In more detail, the small opening side which is in tapered cylindrical shape is connected onto the upper side opening brim portion of the culture medium holding portions 45a through 45c.

The transfer units 31 through 33 positioned at the upstream side in the transfer direction are shown as the state that the leaf supporting portions 46a through 46c are omitted from the above explained transfer units 34 through 37. In other words, at the stage that the leaves 91 of the plants start growing, the leaf supporting portions 46a through 46c are installed. Since the leaf supporting portions 46a through 46c are not installed to the transfer units 31 through 33, the transfer units 31 through 33 are mutually closely positioned.

On the other hand, since the leaf supporting portions 46a through 46c are attached to the transfer units 34 through 37 positioned at the downstream side in the transfer direction, the transfer units 34 through 37 are mutually positioned more separately. Particularly, since the leaves 91 on the transfer units 36 and 37 are grown up so large that the size of the leaves 91 exceeds the size of the leaf supporting portions 46a through 46c, the separation distances between the transfer units 36 and 37 is set to be larger than the separation distance between the transfer units 34 and 35.

Under such situation, the first lighting device 16 which faces the transfer units 31 through 33 sheds light to the seedling culture media 44a through 44c from the closest position therefrom, under the state that the leaf supporting portions 46a through 46c are not installed to the culture medium holding portions 45a through 45c. The second lighting device 17 which faces the transfer units 34 and 35 sheds light to the seedling culture media 44a through 44c from the position far therefrom in up/down direction by the height of the leaf supporting portions 46a through 46c under the state that the leaf supporting portions 46a through 46c are attached to the culture medium holding portions 45a through 45c. The third lighting device 18 which faces the transfer units 36 and 37 sheds light to the seedling culture media 44a through 44c from the position farthest therefrom in up/down direction, under the state that the leaf supporting portions 46a through 46c are installed to the culture medium holding portions 45a through 45c. In other words, the lighting devices 16 through 18 are installed to a position corresponding to the height of the plants in response to growing thereof.

(3. Process After Grown-up)

Figure 5A:
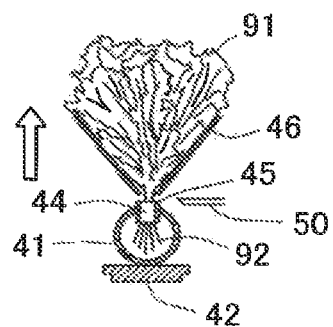
FIG. 5A is a view of the state of plant at the termination of cultivation, wherein the leaf supporting portion is separated from the culture medium holding portion and the leaves are cut at the base portion thereof from the root portion of the plants.

Next, the process of treatment by the worker after the plants are grown up will be explained with reference to FIGS. 5A through 5C. As shown in FIG. 5A, the leaves 91 grow upward higher than the position of the upper side openings of the leaf supporting portion 46 and project further above the upper side openings.

The worker then uses the cutting tool 50 to separate the leaves 91 from the seedling culture medium 44. In detail, the worker holds the leaf supporting portion 46 upward and separates the leaf supporting portion 46 from the upper end brim of the culture medium holding portion 45. In other words, the leaf supporting portion 46 supports the leaves 91 and is separated from the culture medium holding portion 45 to provide a space between the leaf supporting portion 46 and the culture medium holding portion 45. Under such state, the cutting tool 50 becomes insertable from outside into the space formed at the border portion between the leaf supporting portion 46 and the culture medium holding portion 45 and the worker cuts the base portion of the leaves 91 to separate from the root portion 92 existing in the seedling culture medium 44. Then, as shown in FIG. 5B, the leaves 91 become free state with respect to the root portion 92 and is supported by the leaf supporting portion 46.

As stated above, since the culture medium holding portion 45 and the leaf supporting portion 46 are in a separated state in an entire circumferential direction, the operability of cutting tool 50 can be improved and cutting of the leaves 91 at the base portion can be easily made. In other words, by detachably connecting the culture medium holding portion 45 and the leaf supporting portion 46, the cutting tool 50 can be easily insertable at the border portion between the culture medium holding portion 45 and the leaf supporting portion 46.

Figure 5B:
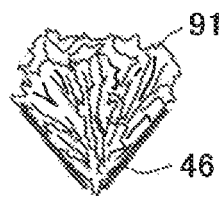
FIG. 5B is a view of the state of plant that the leaves are cut at the base portion thereof from the root portion of the plants and showing the leaves being supported by the leaf supporting portion.
Figure 5C:
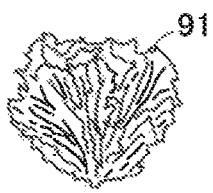
FIG. 5C is a view of plant, wherein the cut leaves are taken out from the leaf supporting portion.

It is noted here that the worker can transfer the leaves 91 to a different place, under the state that the leaves 91 are supported by the leaf supporting portion 46 as shown in FIG. 5B. In other words, the leaf supporting portion 46 functions as a transfer protection member which protects the leaves 91 upon transferring the cut leaves 91. Particularly, since the worker does not directly touch the leaves 91, the leaf supporting portion 46 as the transfer protection member is effective with respect to the sanitation management. Further, by removing the leaf supporting portion 46 as the transfer protection member, only the leaves 91 can be obtained as shown in FIG. 5C. Thus, obtained leaves 91 are packed for example, by a packing material and shipped.

It is noted that the culture medium holding portion 45 and the leaf supporting portion 46 are formed separately, however, different from the structure above, the culture medium holding portion 45 and the leaf supporting portion 46 may be formed as a unit and a hole portion (slit) which penetrates from outside to the inside may be provided at the border portion between the culture medium holding portion 45 and the leaf supporting portion 46. In such case, the worker inserts the cutting tool 50 into the hole portion from outside to cut the base portion of the leaves 91 existing inside thereof.

(4. Detail Structure of Culture Medium Holding Portion & Leaf Supporting Portion)

Figure 6A:
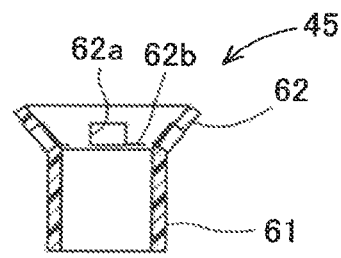
FIG. 6A is an enlarged view of axial cross section of the culture medium holding portion of FIG. 2.
Figure 6B:
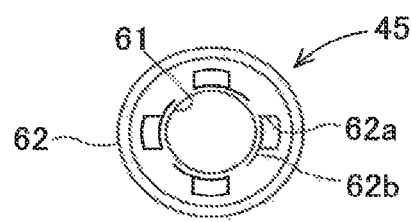
FIG. 6B is a view of the culture medium holding portion seen from the upper direction.
Figure 6C:
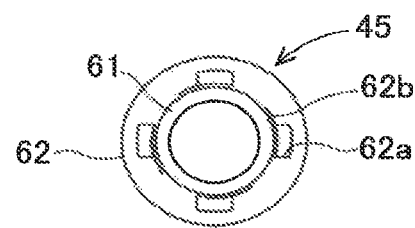
FIG. 6C is a view of the culture medium holding portion seen from the downward direction.

Next, the detail structure of the culture medium holding portion 45 and the leaf supporting portion 46 will be explained hereinafter. First, the culture medium holding portion 45 will be explained with reference to FIGS. 6A through 6C. The culture medium holding portion 45 is formed by a penetrating cylindrical portion 61 and a flange portion 62 which is widened from the upper end of the cylindrical portion 61. The cylindrical portion 61 is formed in a cylindrical shape with the circular cross section and supports the seedling culture medium 44. Further, the flange portion 62 is formed in a reverse conoidal shape extending outwardly and upwardly in a radial direction. In more detail, the flange portion 62 is formed in a tapered cylindrical shape. The flange portion 62 is engaged with the upper side opening edge of the through-holes 41a through 41c (as shown in FIG. 1). A plurality of positioning holes 62a is provided on the flange portion 62 in a circumferential direction having an equal interval from one another. Each hole 62a is formed in a rectangular shape. Further, a plurality of slits 62b is provided on the flange portion 62, which extends from the lower end of each positioning hole 62a in a circumferential direction. The culture medium holding portion 45 is formed by press-forming the resin material.

Figure 7A:
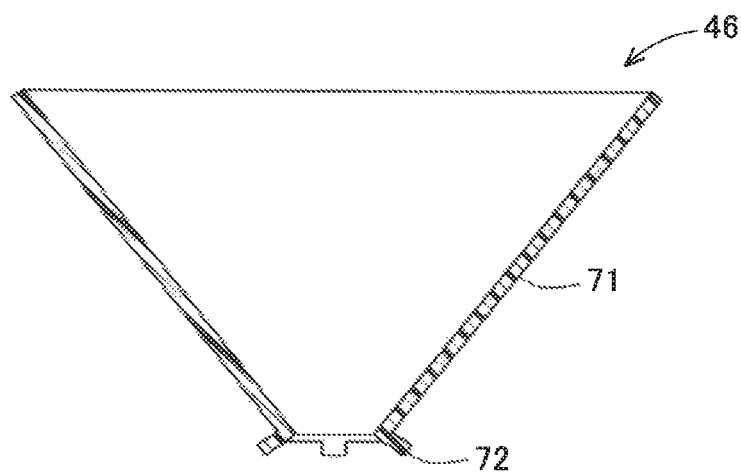
FIG. 7A is an enlarged view of axial cross section of the leaf supporting portion of FIG. 2.
Figure 7B:
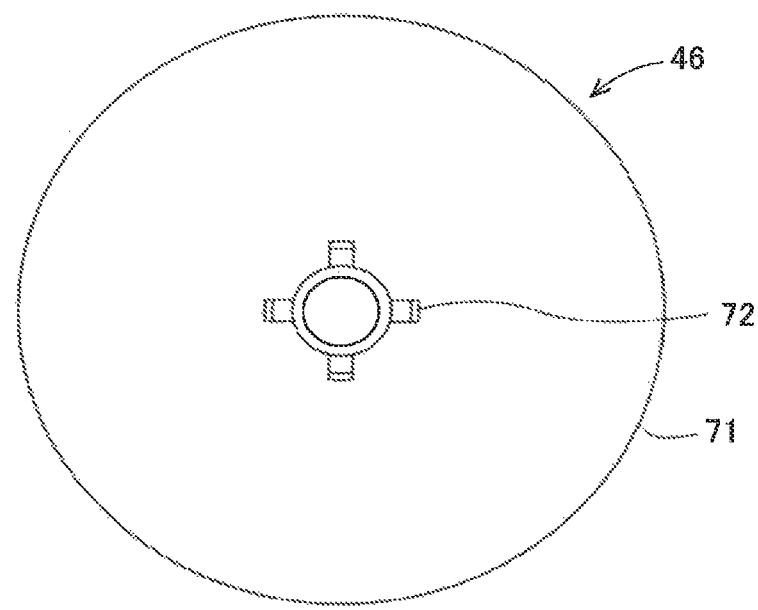
FIG. 7B is a view of the leaf supporting portion seen from the downward direction.

Next, the leaf supporting portion 46 will be explained with reference to FIGS. 7A and 7B. The leaf supporting portion 46 includes a penetrating cylindrical portion 71 and an engagement hook 72 projecting from the lower end of the cylindrical portion 71 in outwardly in a radial direction. According to this embodiment, a plurality of engagement hooks 72 is provided on the leaf supporting portion 46 with an equal interval separated from one another in a circumferential direction. Each engagement hook 72 is provided at a position corresponding to each of the positioning holes 62a.

Figure 8:
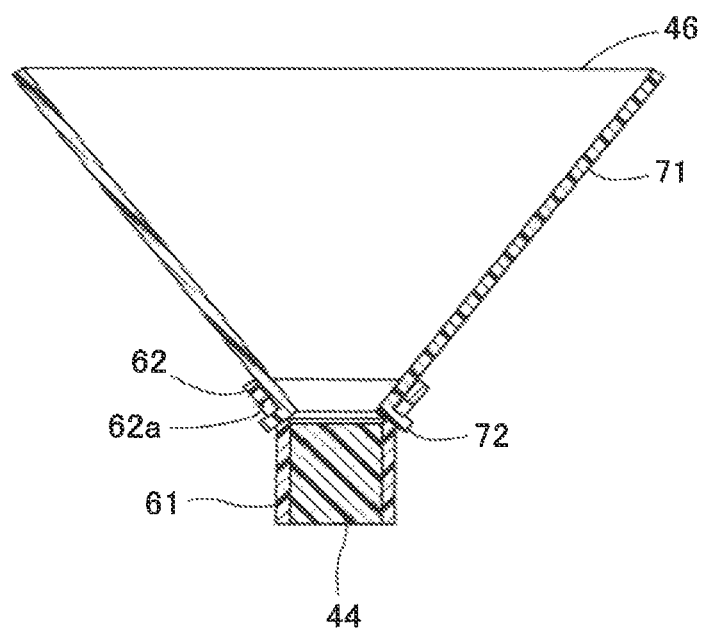
FIG. 8 is a view of state that the seedling culture medium of FIG. 6A and the leaf supporting portion of FIG. 7A are connected.

Next, the connection state of the culture medium holding portion 45 and the leaf supporting portion 46 will be explained with reference to FIG. 8. First, the worker inserts the engagement hooks 72 into the each of corresponding positioning holes 62a from the upper side. Then, each of the engagement hooks 72 is arranged on the lower end brim of each of the corresponding positioning holes 62a then the worker rotates the leaf supporting portion 46 relative to the culture medium holding portion 45 to advance each engagement hook 72 into each of the slits 62b from each corresponding positioning hole 62a. Thus, the leaf supporting portion 46 becomes in a state for positioning to the culture medium holding portion 45. Further, when the worker rotates the leaf supporting portion 46 in the opposite direction relative to the culture medium holding portion 45 thereby to separate the leaf supporting portion 46 from the culture medium holding portion 45.

(5. Effect of Embodiment)

According to the plant cultivation device 1 of the embodiment, the leaves 91 can be obtained by cutting the base portion of the leaves 91 of the cultivated plants to be separated from the root portion 92. The plant cultivation device 1 includes a fluid passage member 41 formed with a fluid passage through which a culture fluid flows and formed with a plurality of through-holes 41a through 41c on an upper surface of the fluid passage member 41 with a predetermined interval separated from one another and arranged along the fluid passage, a seedling culture media 44a through 44c on which seeds of the plants are arranged, a culture medium holding portion 45, 45a through 45c formed in a cylindrical shape, accommodating therein the seedling culture medium to hold thereof, arranged in the plurality of through-holes 41a through 41c of the fluid passage member 41 and absorbing the culture fluid into the seedling culture media 44, 44a through 44c and a leaf supporting portion 46, 46a through 46c formed in a cylindrical shape, arranged at an upper side of the culture medium holding portion 45, 45a through 45c and supporting the leaves 91 which are grown from the seeds at the circumference of the leaves.

The culture medium holding portion 45, 45a through 45c and the leaf supporting portion 46, 46a through 46c are formed such that a cutting tool 50 used for separation between the seedling culture media 44, 44a through 44c and the leaves 91 can be insertable from outside into a bordering portion between the culture medium holding portion 45, 45a through 45c and the leaf supporting portion 46, 46a through 46c.

The plant cultivation device 1 is provided with a cylindrical leaf supporting portion 46, 46a through 46c and accordingly, the drooping of the grown leaves can be suppressed. Further, the culture medium holding portion 45, 45a through 45c and the leaf supporting portion 46, 46a through 46c are formed such that a cutting tool 50 used for separation between the seedling culture media 44, 44a through 44c and the leaves 91 can be insertable from outside into a bordering portion between the culture medium holding portion 45, 45a through 45c and the leaf supporting portion 46, 46a through 46c. Thus, the workability of cutting process of cutting the leaves 91 from the root portion 92 of the plant can be improved, suppressing the drooping of the leaves.

Further, the leaf supporting portions 46, 46a through 46c are formed separately from the culture medium holding portions 45, 45a through 45c and detachably attached to the culture medium holding portions 45, 45a through 45c. The leaf supporting portions 46, 46a through 46c support the leaves 91 and are separated from the culture medium holding portions 45, 45a through 45c to provide a space between the leaf supporting portions 46, 46a through 46c and the culture medium holding portions 45, 45a through 45c. Under such state, the cutting tool 50 becomes insertable from outside into the space formed at the border portion between the leaf supporting portion 46, 46a through 46c and the culture medium holding portion 45, 45a through 45c. Since the culture medium holding portions 45, 45a through 45c and the leaf supporting portions 46, 46a through 46c are in a separated state in an entire circumferential direction, the operability of cutting tool 50 can be improved and cutting of the leaves 91 at the base portion can be easily made.

Further, the leaf supporting portions 46, 46a through 46c are formed in a tapered cylindrical shape and are connected to the cylindrical, tapered small diameter opening side of the culture medium holding portions 45, 45a through 45c. Thus, the leaves 91 of the plants are surely prevented from drooping down. Further, the worker can closely approach the cutting tool 50 more to the base portion of the leaves 91 upon cutting operation of the base portion of the leaves 91. This can extremely improve the workability of cutting.

Further, one of the leaf supporting portions 46, 46a through 46c and the culture medium holding portions 45, 45a through 45c includes an engagement hook 72 which is engaged with the other one of the leaf supporting portions 46, 46a through 46c and the culture medium holding portions 45, 45a through 45c. The detachable operation between the leaf supporting portions 46, 46a through 46c and the culture medium holding portions 45, 45a through 45c can be easily made due to the provision of the engagement hook 72.

Still further, the leaf supporting portions 46, 46a through 46c include a cylindrical portion 71 and an engagement hook 72 projecting from the lower end of the cylindrical portion 71 outwardly in a radial direction and engaged with the culture medium holding portions 45, 45a through 45c. The culture medium holding portions 45, 45a through 45c include a cylindrical portion 61 and a flange portion 62 which is widened from the upper end of the cylindrical portion 61 and formed in a reverse conoidal shape extending outwardly and upwardly in a radial direction. The flange portion 62 includes a plurality of positioning holes 62*a* in a circumferential direction corresponding to the positions of the engagement hooks 72 and a plurality of slits 62*b* which extends from the lower end of each positioning hole 62*a* in a circumferential direction. By rotating the leaf supporting portions 46, 46*a* through 46*c* relative to the culture medium holding portions 45, 45*a* through 45*c* to advance each engagement hook 72 into each of the slits 62*b* from each corresponding positioning hole 62*a*. Thus, the detachable operation between the leaf supporting portions 46, 46*a* through 46*c* and the culture medium holding portions 45, 45*a* through 45*c* can be easily made.

Further, the flange portion 62 engages with the upper side opening edge of the through-holes 41*a* through 41*c* of the fluid passage member 41. In other words, the flange portion 62 serves as a connecting function for connecting the leaf supporting portions 46, 46*a* through 46*c* and an engagement function for engaging with the upper side opening of the through-holes 41*a* through 41*c* of the fluid passage member 41.

Further, the leaf supporting portions 46, 46*a* through 46*c* function as a transfer protection member which protects the leaves 91 upon transferring of the cut leaves 91. Since the worker does not touch the leaves 91 of the plants directly, the leaf supporting portion 46 as the transfer protection member is effective with respect to the sanitation management.

The plant cultivation device 1 includes the lighting devices 16 through 18 which shed light over the seedling culture media 44, 44*a* through 44*c* from the upper side thereof. The lighting devices 16 through 18 shed light to the seedling culture media 44, 44*a* through 44*c* at a position relatively close to the seedling culture media 44, 44*a* through 44*c*, under the state that the leaf supporting portions 46, 46*a* through 46*c* are not attached to the culture medium holding portions 45, 45*a* through 45*c* and shed light to the seedling culture media 44, 44*a* through 44*c* at a position relatively far from the seedling culture media 44, 44*a* through 44*c*, under the state that the leaf supporting portions 46, 46*a* through 46*c* are attached to the culture medium holding portions 45, 45*a* through 45*c*. Since the light is applied to the plants at various positions depending on the cultivation stage of the plants, the leaves 91 of the plants can be cultivated in a short period of time.

The culture medium holding portions 45, 45*a* through 45*c* and the leaf supporting portions 46, 46*a* through 46*c* are made by a resin material and formed to have a flexible film thickness. Thus, the force applied on the leaves 91 of the plants by the leaf supporting portions 46, 46*a* through 46*c* can be lessened. Further, the attachment of the leaf supporting portions 46, 46*a* through 46*c* to the culture medium holding portions 45, 45*a* through 45*c* or detachment thereof from the culture medium holding portions 45, 45*a* through 45*c* by the worker can be easily made.

Further, the leaf supporting portions 46, 46*a* through 46*c* and the culture medium holding portions 45, 45*a* through 45*c* are formed in one piece and hole portion is formed at the bordering portion between the leaf supporting portions 46, 46*a* through 46*c* and the culture medium holding portions 45, 45*a* through 45*c*, penetrating therethrough from outside towards inside. Thus, holding the leaves not to be drooped down, the workability of cutting the leaves 91 from the root portion 92 thereof can be sufficiently improved.

REFERENCE SIGNS LIST

1 . . . plant cultivation device, 11, 12 . . . rail, 13, 14, 15 . . . transfer mechanism, 16, 17, 18 . . . lighting device, 21 . . . culture fluid supplying portion, 22 . . . culture fluid collecting portion, 31 through 37 . . . transfer unit, 41 . . . fluid passage member, 41*a* through 41*c* . . . through-holes, 41*d* . . . hole, 42, 43 . . . supporting member, 44, 44*a* through 44*c* . . . seedling culture medium, 45, 45*a* through 45*c* . . . culture medium holding portion, 46, 46*a* through 46*c* . . . leaf supporting portion, 50 . . . cutting tool, 61 . . . cylindrical portion, 62 . . . flange portion, 62*a* . . . positioning hole, 62*b* . . . slit, 71 . . . cylindrical portion, 72 . . . engagement hook, 91 . . . leaves, 92 . . . root portion.

The invention claimed is:

1. A plant cultivation device which obtains leaves of a cultivated plant by cutting a base portion of the leaves from a root portion of the cultivated plant, comprising:
  a fluid passage member formed in a tubular shape with a fluid passage through which a culture fluid flows and formed with a plurality of through-holes on an upper surface of the fluid passage member with a predetermined interval separated from one another and arranged along the fluid passage;
  a seedling culture medium on which seeds of the plants are arranged;
  a culture medium holding portion including
    a cylindrical portion formed in a cylindrical shape and including an inner peripheral surface and an outer peripheral surface, the cylindrical portion accommodating therein the seedling culture medium to hold the seedling culture medium under a state that the seedling culture medium is in contact with the inner peripheral surface, and the outer peripheral surface is arranged in one of the plurality of through-holes of the fluid passage member and absorbing the culture fluid into the seedling culture medium, and
    a flange portion extending from an upper end of the cylindrical portion, the flange portion formed of a wall with a reverse conoidal shape extending radially outward and upward, the flange portion including a plurality of positioning holes formed through the wall; and
  a leaf supporting portion formed in a tapered cylindrical shape, arranged at an upper side of the culture medium holding portion and supporting the leaves which are cultivated from the seeds at the circumference of the leaves, the leaf supporting portion including a plurality of engagement hooks configured to engage with the plurality of positioning holes wherein,
  the culture medium holding portion and the leaf supporting portion are formed such that a cutting tool, used for separation between the seedling culture medium and the leaves, can be insertable from outside into a bordering portion between the culture medium holding portion and the leaf supporting portion, and
  the leaf supporting portion is formed separately from the culture medium holding portion and is arranged at the upper side of the culture medium holding portion such that a small diameter opening side of the tapered cylindrical shape faces downward and is detachably connected to an upper side opening brim of the culture medium holding portion via the engagement hooks and the positioning holes.

2. The plant cultivation device according to claim 1, wherein,
under a state that the leaf supporting portion supports the leaves and is detached from the culture medium holding portion to form a gap therebetween, the cutting tool can be insertable from outside into the bordering portion between the culture medium holding portion and the leaf supporting portion.

3. The plant cultivation device according to claim 1, wherein
by a rotation of the leaf supporting portion relative to the culture medium holding portion about an axis line the engagement hook advances into a slit formed in the wall of the flange from the positioning hole.

4. The plant cultivation device according to claim 1, wherein,
the flange portion engages with an upper side opening brim of the through holes of the fluid passage member.

5. The plant cultivation device according to claim 1, wherein,
the leaf supporting portion functions as a transfer protection member which protects the leaves upon transferring of the cut leaves.

6. The plant cultivation device according to claim 1, further comprising:
a lighting device which sheds light to the seedling culture medium from upper side thereof, wherein,
the lighting device sheds light to the seedling culture medium at a position adjacent to the seedling culture medium, when the leaf supporting portion is under a state before being installed to the culture medium holding portion and,
the lighting device sheds light to the seedling culture medium at a position further separated from the seedling culture medium from the position adjacent thereto, when the leaf supporting portion is under a state after having been installed to the culture medium holding portion.

7. The plant cultivation device according to claim 1, wherein,
the culture medium holding portion and the leaf supporting portion are made by a resin material and are formed to have a flexible film thickness.

8. The plant cultivation device according to claim 1, wherein,
the plurality of through-holes extend in a radial direction of the fluid passage member and are separated from one another along an axial direction of the fluid passage member.

9. The plant cultivation device according to claim 1, further comprising:
a transfer device on which the fluid passage member is supported, and
a pair of rails parallel to each other on which the transfer device is configured travel along the lengths of the pair of rails.

10. The plant cultivation device according to claim 1, wherein the leaves are transferably supported by the leaf supporting portion under a state that the cutting tool is inserted from the outside and the leaves are cut from root portion thereof at the bordering portion.

11. The plant cultivation device according to claim 1, wherein the engagement hooks extend outwardly and downward in the radial direction.

12. The plant cultivation device according to claim 1, wherein an outer peripheral surface of the flange portion engages with an upper side opening edge of the one of the plurality of through-holes.

* * * * *